S. D. FENIMORE.
TROLLEY POLE.
APPLICATION FILED DEC. 4, 1907.
903,366.
Patented Nov. 10, 1908.
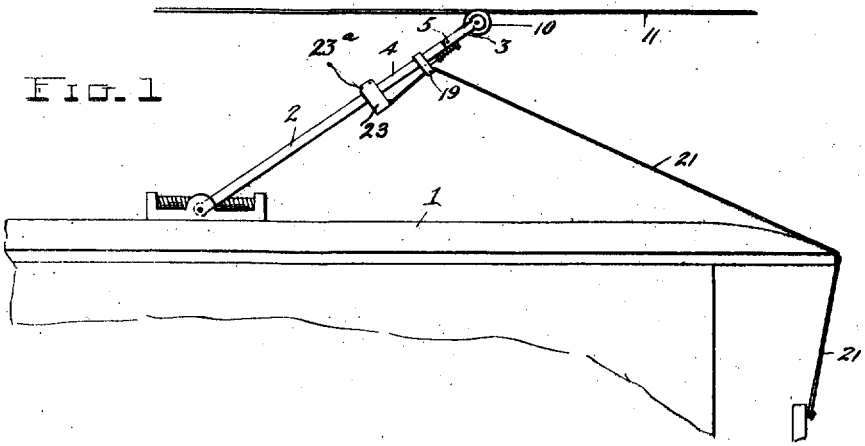

UNITED STATES PATENT OFFICE.

SEYBERT D. FENIMORE, OF FOLCROFT, PENNSYLVANIA.

TROLLEY-POLE.

No. 903,366.  Specification of Letters Patent.  Patented Nov. 10, 1908.

Application filed December 4, 1907. Serial No. 405,081.

*To all whom it may concern:*

Be it known that I, SEYBERT D. FENIMORE, a citizen of the United States, residing at Folcroft, in the county of Delaware and State of Pennsylvania, have invented certain new and useful Improvements in Trolley-Poles, of which the following is a specification, reference being had to the accompanying drawings.

My invention relates to improvements in trolleys and consists of the novel features of construction and the combination and arrangement of parts hereinafter described and claimed.

The object of the invention is to provide a device of this character by which the trolley wheel will be held firmly in contact with the trolley wire and at the same time prevent it from flying up and striking the cross arms that support the trolley wire, when the wheel jumps the wire.

Another object of the invention is to provide a trolley pole with an operating rope which will be drawn taut and prevented from hanging slack and which will also limit the upward swinging movement of the pole when the wheel leaves the wire.

The above and other objects of the invention, which will appear as the nature of the invention is better understood, are attained in its preferred embodiment illustrated in the accompanying drawings, in which Figure 1 is a side elevation of my improved trolley pole showing the same in use; Fig. 2 is a detail vertical longitudinal section taken through the upper portion of the devise and on an enlarged scale; Fig. 3 is a top plan view of the parts shown in Fig. 2; and Figs. 4 and 5 are transverse sections taken, respectively, on the planes indicated by the lines 4—4 and 5—5 in Fig. 2.

In the drawings, 1 denotes a portion of a car and 2 a spring pressed, pivotally mounted trolley pole. The latter may be of any suitable form and construction and has upper and lower sections 3, 4 connected by a hinge or knuckle joint 5. This joint is preferably formed by reducing the upper end of the lower section 4 to provide a tongue 6 and square shoulders 7 on opposite sides of the latter, and by recessing the lower end of the upper section to receive said tongue and beveling said lower end of said section to provide angular stop shoulders 8 which coact with the shoulders 7. A transverse pivot bolt or pin 9 passes through the recessed end of the section 3 and the tongue 6 to pivotally unite the two sections so that the upper section can swing upwardly to an angular position with respect to the lower section 4. The upper section 3 of the trolley pole is comparatively short and carries a trolley wheel 10 which may be of any suitable form and construction and mounted in any suitable manner. As illustrated it is grooved to engage the trolley wire 11 and it is journaled in the forked upper end 12 of said pole section 3.

When the trolley wheel is engaged with the wire 11 the shoulders 7, 8 engage each other and the two pole sections are in longitudinal alinement, but when the wheel leaves the wire or when the tension exerted by the actuating springs of the lower section 4 is removed from said section, the upper section 3 is swung to its angular position shown in Fig. 2 by a coil spring 13 arranged between a combined guide and stop lug 14 on the section 2 and a stop lug 15 on the section 3. The spring 13 surrounds a rod 16 which has its upper end fixed to the lug 15 and its lower end projecting through an aperture in the lug 14 and pivotally or loosely connected to a pivoted dog or clutch 17 by passing said end of the rod through a flared aperture in the dog and then heading or upsetting said end. The dog is pivoted at its upper end as at 18 in a recess in the collar 19 which is fixed upon the pole section 4. Also arranged in the recess in said collar 19 is a guide pulley 20 for the cord, rope or other flexible element 21 by means of which the trolley pole is raised and lowered. The rope 21 has its lower end fixed to the car and its other end passing through the recess in the collar 19 over the pulley 20 and beneath the clutch 17, and attached to a weight 23 which is slidably mounted upon the pole 2 and provided for the purpose of holding said rope taut. The weight 23 has an open portion 24 to loosely receive the section 4 of the pole and in the top of this open portion are journaled one or more rollers 25 which are adapted to run upon the top of the section 4 and allow the weight to slide easily thereon. It will be seen that the provision of the weight 23 causes the trolley cord to be always drawn taut and prevents it from hanging slack and being in the way at the same time the pole is permitted to have free swinging movement. The front and lower corner of the upper portion of the weight 23 is beveled as shown at 23ᵃ so that should for any reason the device fail to operate as above explained, the weight will not offer any serious obstruction to any brace wire, cross arm, or the like which may be in the path of the pole, since said beveled portion will allow such wire or arm to slip over the weight.

The arrangement of the dog or clutch 17 and its connection to the rod 16 is such that when the trolley wheel is engaged with the wire 11 and the two pole sections are in alinement the clutch 17 will be held out of contact with the rope so that it may pass freely back and forth over the pulley 20, but the instant the wheel leaves the trolley wire and the upper section 3 swings to an angular position the rod 16 will actuate the clutch and cause its free end to press the rope against the pulley 20 and thus clamp the rope and prevent the trolley pole from swinging upwardly into the path of the usual cross arms which support the trolley wire. Thus it will be seen that the instant the wheel leaves the wire the rope will be clutched and the pole prevented from swinging upwardly.

Having thus described my invention what I claim is:

1. The combination of a trolley pole having upper and lower sections connected by a knuckle joint, a lug projecting from the upper section, an apertured guide lug projecting from the lower section, a collar upon the lower section provided with a recess, a pulley journaled in said recess in the collar, an operating rope engaged with said pulley, a dog pivoted at its upper end in said recess in the collar above the pulley and having its free lower end formed with a clutch surface to engage the rope passing over said pulley, a rod connected to the lug upon the upper pole section and passing through the aperture in the lug upon the lower pole section and loosely connected to the intermediate portion of said dog, a coil spring surrounding said rod and confined between the two lugs upon the upper and lower pole sections and means for taking up the slack in said rope.

2. The combination of a trolley pole having upper and lower sections, the lower section having its opposite sides recessed to provide a central tongue and stop shoulders, the upper section having its adjacent end recessed to receive said tongue and beveled to provide stop shoulders to engage those on the lower section, a transverse pivot passed through said sections to pivotally unite them for a limited swinging movement, a lug upon the upper section, an apertured lug upon the lower section, a collar upon the lower section and provided with a recess, a guide pulley journaled in the lower portion of the recess in the collar, an operating rope passed over said pulley, means for taking up the slack in said rope, a dog pivoted at its upper end in the upper portion of the recess in the collar and having its lower end shaped to provide a clutch face which engages the rope upon the pulley, the intermediate portion of said dog being formed with an opening, a rod fixed at one end to the lug upon the upper pole section and having its lower portion passed through the aperture in the lug upon the lower pole section and loosely secured in the aperture in the dog, and a coil spring surrounding said rod and confined between the lugs upon the two pole sections, substantially as described.

In testimony whereof I hereunto affix my signature in the presence of two witnesses.

SEYBERT D. FENIMORE.

Witnesses:
SAML. C. WAGNER, Jr.,
JOHN J. BRENNER.